(12) United States Patent
Capellmann et al.

(10) Patent No.: US 11,040,592 B2
(45) Date of Patent: Jun. 22, 2021

(54) CLIMATE CONTROL DEVICE FOR A MOTOR VEHICLE

(71) Applicant: Hanon Systems, Daejeon (KR)

(72) Inventors: Christoph Capellmann, Würselen (DE); Evzi Duka, Cologne (DE); Thomas Ehlers, Krefeld (DE)

(73) Assignee: HANON SYSTEMS, Daejeon (KR)

( * ) Notice: Subject to any disclaimer, the term of this patent is extended or adjusted under 35 U.S.C. 154(b) by 44 days.

(21) Appl. No.: 16/282,603

(22) Filed: Feb. 22, 2019

(65) Prior Publication Data
US 2019/0283523 A1    Sep. 19, 2019

(30) Foreign Application Priority Data

Mar. 19, 2018  (DE) .................... 10 2018 106 321.0

(51) Int. Cl.
*B60H 1/00* (2006.01)
(52) U.S. Cl.
CPC ....... *B60H 1/0005* (2013.01); *B60H 1/00671* (2013.01); *B60H 1/00871* (2013.01); *B60H 1/00885* (2013.01); *B60H 2001/00164* (2013.01)
(58) Field of Classification Search
CPC .............. B60H 1/0005; B60H 1/00671; B60H 1/00871; B60H 2001/00164; B60H 1/00564; B60H 2001/00085; B60H 2001/00092; B60H 1/00514;
(Continued)

(56) References Cited

U.S. PATENT DOCUMENTS

| 4,453,591 A | * | 6/1984 | Fehr ................. B60H 1/00064 165/202 |
| 5,299,431 A | * | 4/1994 | Iritani ............... B60H 1/00021 62/243 |

(Continued)

FOREIGN PATENT DOCUMENTS

| CN | 106965640 A | * | 7/2017 | ......... B60H 1/00921 |
| DE | 102010029495 A1 | | 12/2011 | |

(Continued)

OTHER PUBLICATIONS

JP2006027377 A—English machine translation.pdf (Year: 2006).*

*Primary Examiner* — Jianying C Atkisson
*Assistant Examiner* — Jose O Class-Quinones
(74) *Attorney, Agent, or Firm* — Norton Rose Fulbright US LLP; James R. Crawford

(57) ABSTRACT

Climate control device for motor vehicle conveys and conditions inflowing air for a passenger compartment includes a housing with a diffuser, a mixing zone and at least two flow paths through which two flows can be conducted in parallel. A heating heat exchanger is disposed in a first flow path to heat an air mass subflow. A heat exchanger is provided for cooling and/or dehumidifying inflowing air. A bypass flow path is provided through which air can flow in parallel to a flow channel with the heat exchanger. At least one flow guide mechanism opens and closes the bypass flow path. flow channel and bypass flow path open out with outlet ports into mixing zone. Outlet port of a bypass flow path is developed for specific discharge of an air mass subflow into first flow path in proximity of an opening site of first flow path into a mixing zone.

17 Claims, 4 Drawing Sheets

Figure 2:
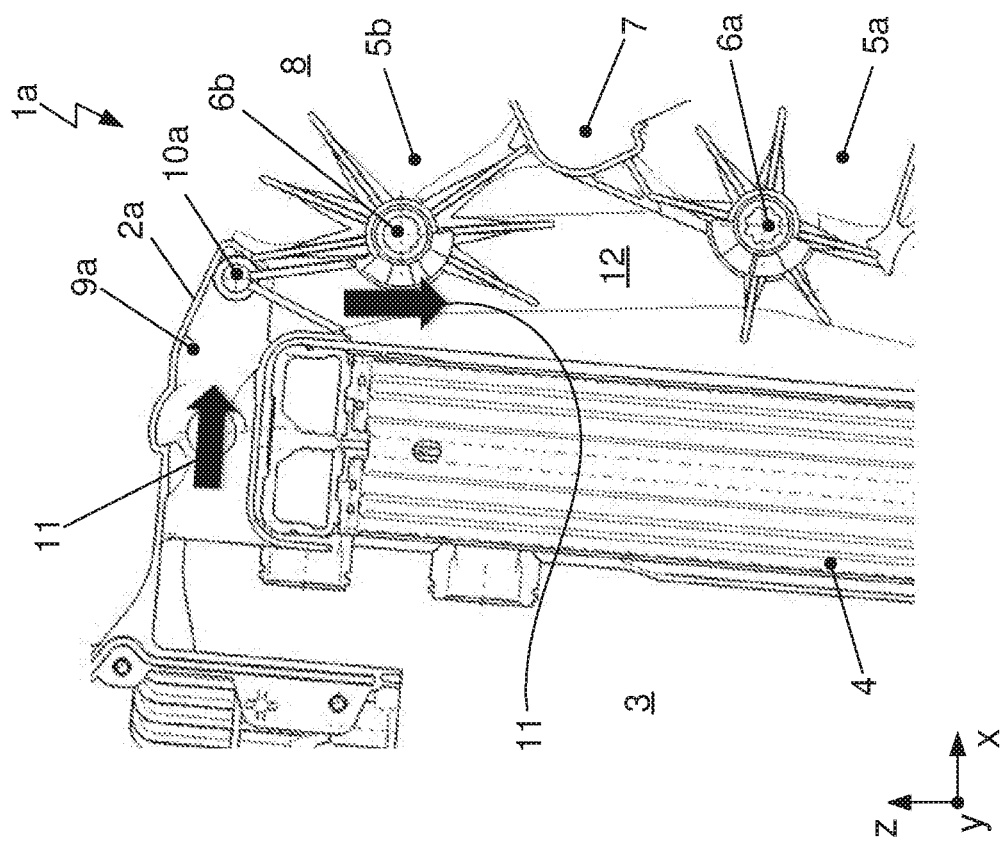

(58) Field of Classification Search
CPC .............. B60H 1/0065; B60H 1/00664; B60H 1/3229; B60H 2001/3478
See application file for complete search history.

(56) References Cited

U.S. PATENT DOCUMENTS

| | | | | |
|---|---|---|---|---|
| 5,738,579 | A * | 4/1998 | Pommier | B60H 1/00071 454/126 |
| 5,975,191 | A * | 11/1999 | Ohashi | B60H 1/00035 165/43 |
| 6,311,763 | B1 * | 11/2001 | Uemura | B60H 1/00664 165/43 |
| 6,330,909 | B1 * | 12/2001 | Takahashi | B60H 1/005 165/202 |
| 6,640,570 | B2 * | 11/2003 | Nishida | B60H 1/00064 165/42 |
| 6,688,120 | B2 * | 2/2004 | Aoki | B60H 1/005 62/133 |
| 9,242,526 | B2 * | 1/2016 | Richter | B60H 1/00028 |
| 9,346,337 | B2 * | 5/2016 | Takahashi | B60H 1/00921 |
| 2008/0061159 | A1 * | 3/2008 | Okano | B60H 1/2225 237/12.3 A |
| 2013/0098595 | A1 | 4/2013 | Schall | |
| 2015/0158365 | A1 * | 6/2015 | Hashimoto | B60H 1/00007 165/11.1 |
| 2015/0174985 | A1 * | 6/2015 | Wawzyniak | B60H 1/0005 165/63 |
| 2016/0272037 | A1 * | 9/2016 | Gesell | B60H 1/00842 |
| 2017/0087956 | A1 * | 3/2017 | Graaf | B60H 1/00921 |

FOREIGN PATENT DOCUMENTS

| | | |
|---|---|---|
| DE | 102010031444 A1 | 1/2012 |
| DE | 102014209452 A1 | 11/2014 |
| EP | 1510375 A1 | 3/2005 |
| JP | 2006027377 A | 2/2006 |
| JP | 2007182206 A | 7/2007 |
| JP | 2011111094 A | 6/2011 |

* cited by examiner

Stand der Technik

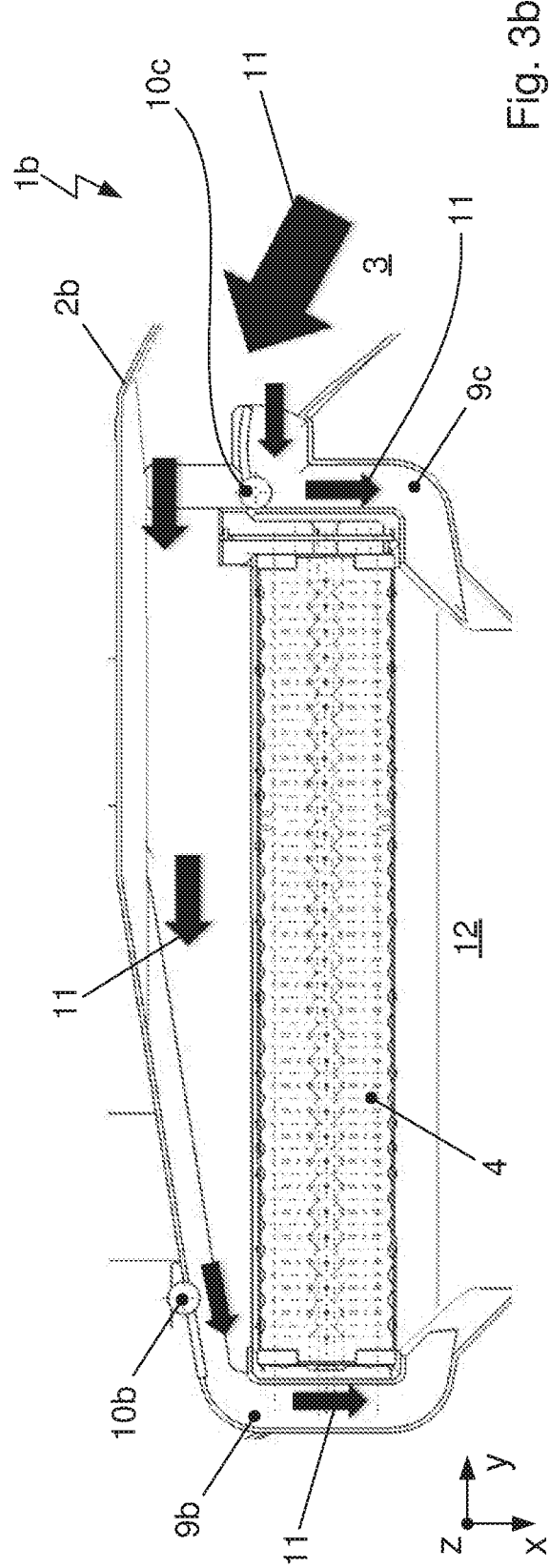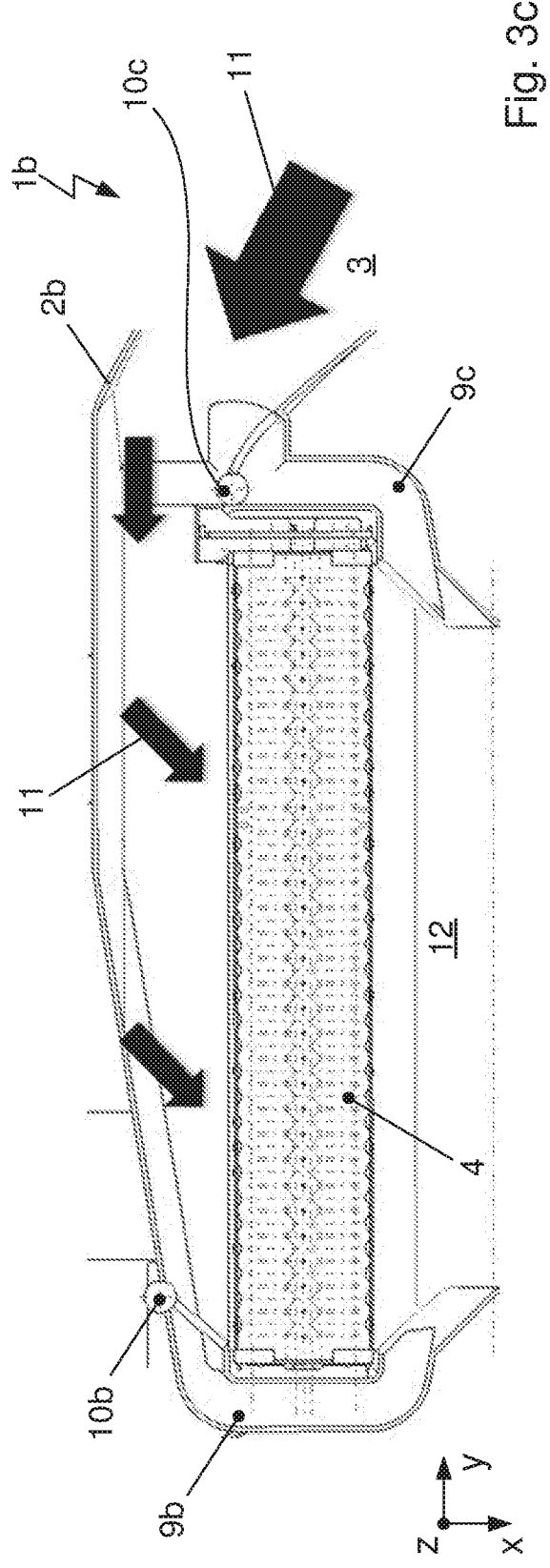

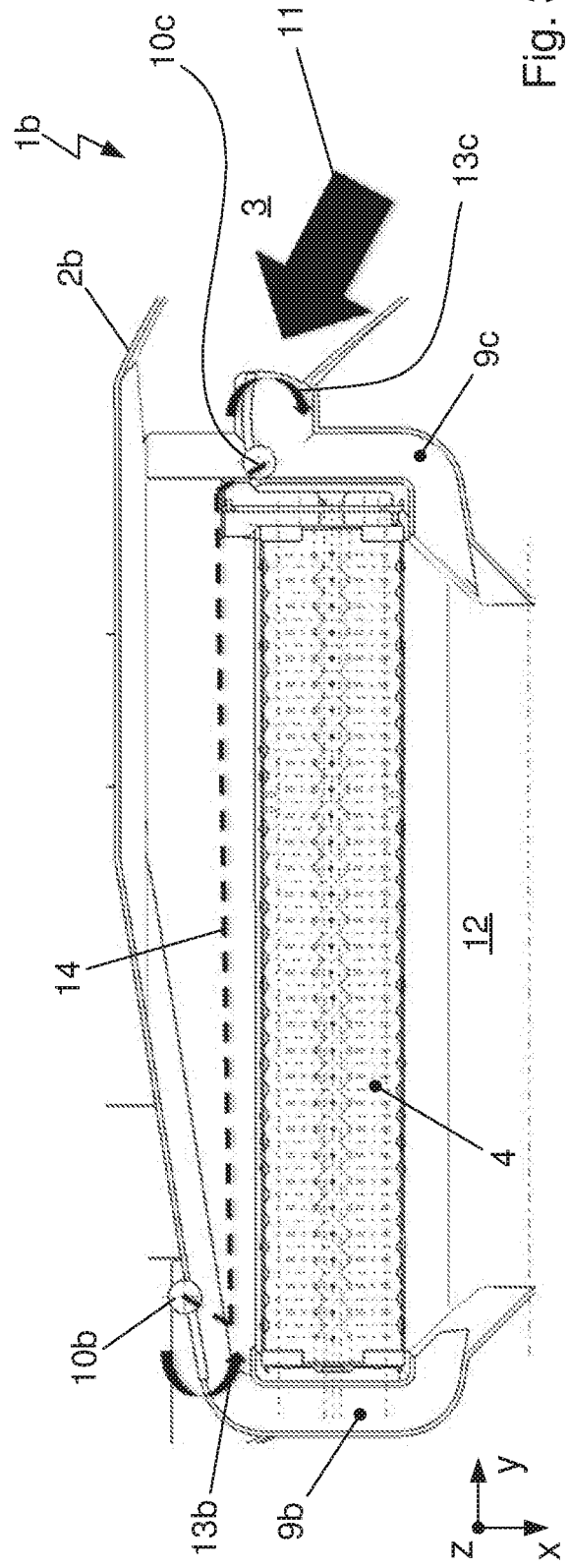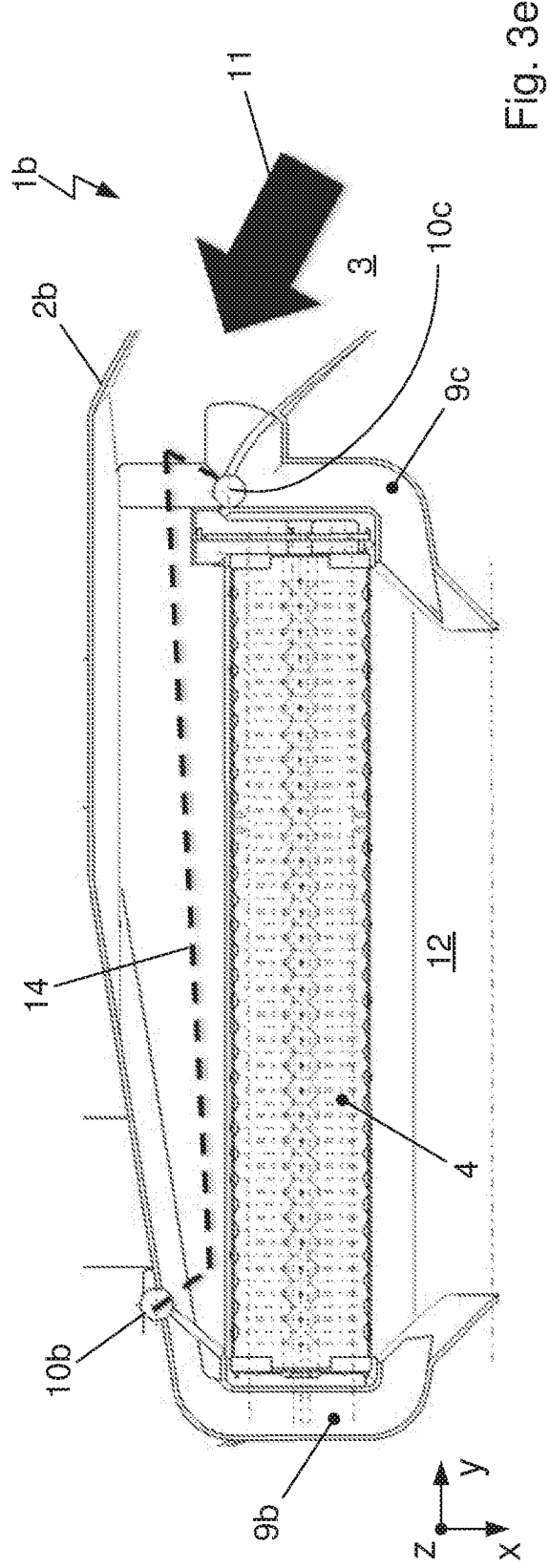

CLIMATE CONTROL DEVICE FOR A MOTOR VEHICLE

This patent application claims priority from German Patent Application No. 10 2018 106 321.0, filed Mar. 19, 2018, which is hereby incorporated herein by reference in its entirety for all purposes.

FIELD OF THE INVENTION

The invention relates to a climate control device for a motor vehicle with means for conveying and conditioning the inflowing air for a passenger compartment. The climate control device comprises a housing with a diffuser downstream of an air inlet, a mixing zone, a mixing chamber and air outlets into the passenger compartment as well as a heat exchanger for cooling and/or dehumidifying the inflowing air and a heating heat exchanger.

BACKGROUND AND SUMMARY OF THE INVENTION

Due to the increasing number of technical components, optimization with respect to installation volume is required in motor vehicles in order to be even able to ensure the desired multiplicity of functions by accommodating the components. For this reason, voluminous components for climate control, as they are known in stationary climate control systems in the form of mixing chambers, flow guide mechanisms and swirling means cannot be employed in motor vehicles due to the low space conditions.

An additional requirement made of a climate control system of a motor vehicle that conditions, optionally divides and conducts the individual air mass flows into different areas of the passenger compartment includes supplying different air outlets of the climate control system with differently tempered air mass flows depending on their position and function. The supplied air mass flow is herein conducted across different heat exchangers such that the air is cooled and dehumidified and, if necessary, heated again and subsequently guided into the passenger compartment. The air is herein blown into the footwell for example as well as through openings in the dashboard into the passenger compartment and additionally through outlets directly to the windshield in order to keep it free of condensation or to defrost it.

In conventional climate control systems the air to be conditioned is taken in by a fan into a climate control device and conducted through a filter to a heat exchanger operated as evaporator of a refrigerant circulation. When flowing across the heat transfer surface of the evaporator, the air quantity in its entirety is cooled and/or dehumidified. The evaporator located within the air flow herein causes marked flow resistance.

Prior art discloses furthermore climate control systems which contain a bypass flow path of the air around the evaporator in order to provide, for specific operating modes of the climate control system, the maximal air quantity necessary for example for pure heating operation of the air for the footwell or for the incident flow against the windshield to prevent condensation formation. In this case a first partial air quantity is conducted through the evaporator, while a second partial air quantity is guided through the bypass flow path and consequently past the evaporator.

An additional reason for conducting at least a partial air quantity past the evaporator is the increase of the efficiency of the climate control system operation which, especially in the case of electrically driven motor vehicles, electric cars for short, affects the range of the vehicle. The partial air quantity guided through the bypass flow path, and thus past the evaporator, is neither cooled nor dehumidified such that lower cooling power needs to be applied by the refrigerant circulation at the evaporator. In addition, the nonconditioned and, in particular, not cooled air quantity following the evaporator in the direction of flow of the air does not need to be additionally heated when flowing across the heat transfer surface of a heating heat exchanger, which further lowers the energy consumption of the climate control system. Such operating modes of the climate control system are practical and feasible at certain temperatures and at a certain humidity of the outside air and in the case of certain air quantity requirements.

To save sufficient energy, however, a correspondingly large air quantity must be guided through the bypass flow path and past the evaporator. Moreover, the second partial air quantity guided through the bypass flow path and the partial air quantity that flowed through the evaporator must be combined again in such a manner that the characteristic of the temperature distribution at the air outlets of the climate control device is not negatively affected.

The bypass flow path around the evaporator must, furthermore, be implemented such that it can be closed with an air guide mechanism, such as an air damper, in such manner that the partial air quantity through the bypass flow path can be controlled since the routing around the evaporator, at least with a partial air quantity, through the bypass flow path is not practical or sensible in every operating mode.

DE 10 2010 029 495 A1 describes a climate control system for a motor vehicle with a first air routing for guiding a first portion of an air flow and a second air routing for guiding a second portion of the air flow. Within the first air routing an evaporator of a refrigerant circulation is disposed in order to cool the first portion of the air flow. By means of a mixing damper, the first air flow from the first air routing is mixed with the second portion of the air flow from the second air routing, developed as a bypass flow path around the evaporator, to generate a tempered air flow.

The bypass flow path is disposed in the vertical direction above the evaporator such that the second portion of the air flow, conducted through the bypass flow path, after it leaves the bypass flow path can flow in a direct flow path into a mixing chamber or directly to at least one of the air outlets without being mixed with the first portion of the air flow, in particular with low humidity, conducted through the evaporator and optionally a heating heat exchanger. Therefore, for example ambient air with high humidity with a very high risk of condensing, can be guided directly to the windshield. For another, there is a high probability that the required temperature distribution of the air flows at the air outlets of the climate control device into the passenger compartment is not ensured since the ambient air with high humidity does not reach the mixing chamber.

The present invention addresses the problem of providing a climate control device for a climate control system in which at least a partial air quantity conveyed in the climate control device is directed past the evaporator, wherein a bypass flow path is to be developed and disposed such that the effect of the bypass flow path on the temperature distribution of the air to be supplied to the passenger compartment or the effect on control curves of the air temperature is minimized and an air quantity conductible through the bypass flow path is maximal at given low installation space. The air is herein to be guided selectively and the space requirement of the components to be employed is to be minimal.

The problem is resolved through the subject matter with the characteristics of the independent patent claim. Further developments are specified in the dependent patent claims.

The problem is resolved through a climate control device according to the invention for a motor vehicle with means for conveying and for conditioning the inflowing air for a passenger compartment. The climate control device comprises a housing in the flow direction of the air with an air inlet, a diffuser, a mixing zone and at least two flow paths disposed such that flow can be conducted through them in parallel. The flow paths extend each from the mixing zone to a mixing chamber. Within a first flow path a heating heat exchanger is disposed for heating at least one air mass subflow.

The climate control device comprises additionally a heat exchanger for cooling and/or dehumidifying the inflowing air, which heat exchanger is disposed within a flow channel filling the entire cross section of the flow channel, as well as at least one bypass flow path through which air can flow in parallel to the flow channel with the heat exchanger. The bypass flow path is implemented with at least one flow guide mechanism for opening and closing a flow cross section of the bypass flow path. The flow channel with the heat exchanger for cooling and/or dehumidifying the inflowing air and the bypass flow path each open out with outlet ports into the mixing zone.

By the disposition of the heat exchanger such that it fills the cross section of the flow channel is to be understood that an air mass flow guided through the flow channel is conducted in its entirety across a heat transfer surface of the heat exchanger since the contact areas between the heat exchanger and the wall of the flow channel are advantageously technically closed air-tight.

According to the concept of the invention, the outlet port of at least one bypass flow path is implemented in the proximity of an opening site of the first flow path into the mixing zone for specifically leading an air mass subflow, conveyed through the bypass flow path, into the first flow path developed with the heating heat exchanger.

According to a first alternative embodiment of the invention the flow guide mechanism is implemented as an end-supported air damper with a rotational axis disposed on a first end of the air damper. The flow guide mechanism is herein disposed at an outlet port of the bypass flow path into the mixing zone such that the bypass flow path, in an end position of the flow guide mechanism is completely opened and a second end, distal to the first end, of the flow guide mechanism projects into the mixing zone extending the bypass flow path.

The rotational axis of the flow guide mechanism is advantageously disposed outside of a flow cross section of the bypass flow path.

In its end position with the completely opened bypass flow path, the flow guide mechanism is oriented such that it at least partially closes a flow cross section of a second flow path extending parallel to the first flow path.

According to a second alternative embodiment of the invention, at least one first bypass flow path and a second bypass flow path are implemented with each including a flow guide mechanism. They are disposed at end sides, developed oppositely to one another, of the heat exchanger for cooling and/or dehumidifying the inflowing air.

The bypass flow path to the flow channel with the heat exchanger for cooling and/or dehumidifying the inflowing air is implemented in two parts with a first bypass flow path and a second bypass flow path.

According to a further development of the invention, the first bypass flow path and the second bypass flow path are disposed such that they open out into the mixing zone at opposite sides.

The flow guide mechanisms are advantageously each implemented as an end-supported air damper with a rotational axis on a first end of the air damper. Each rotational axis is herein disposed outside of a flow cross section of the bypass flow path.

The flow guide mechanism of the first bypass flow path is preferably disposed at the inlet port of the first bypass flow path as well as in the proximity of a wall of the housing. In an end position, in which the bypass flow path is completely opened, the flow guide mechanism is advantageously in contact on the wall of the housing.

According to a further preferred embodiment of the invention, the flow guide mechanism of the second bypass flow path is disposed at the inlet port of the second bypass flow path. In an end position, in which the bypass flow path is completely opened, the flow guide mechanism is advantageously disposed such that with a second end, implemented distally to the first end, it projects into a flow channel, extending from an air inlet port, in particular from a diffuser, downstream of the air inlet port in the direction of flow of the air, to the heat exchanger for cooling and/or dehumidifying the inflowing air, and such that it divides a flow cross section of the flow channel. The flow guide mechanism, moreover, in an end position, in which the bypass flow path is completely closed, is advantageously disposed with the second end on a wall of the flow channel such that it extends the wall or closes it.

The flow channel extending from the air inlet to the heat exchanger for cooling and/or dehumidifying the inflowing air is also referred to as diffuser of the housing.

A further advantage of the invention resides therein that the flow guide mechanisms are each developed such that they are pivotable about a rotational axis in a rotational direction oppositely to one another.

According to a further development of the invention the flow guide mechanisms are mechanically connected with one another with a coupling element for the simultaneous control of the opening and closing of the bypass flow paths.

According to a third alternative embodiment of the invention, the heat exchanger for cooling and/or dehumidifying the inflowing air is developed divided into at least two elements. The elements are disposed equidistantly forming an interspace such that the bypass flow path is disposed between the elements.

According to an advantageous embodiment of the invention the flow guide mechanism is implemented as an end-supported air damper with a rotational axis disposed on a first end of the air damper as well as being disposed on an outlet port of the bypass flow path into the mixing zone such that in an end position of the flow guide mechanism, the bypass flow path is completely opened and a second end, distal to the first end, projects into the mixing zone.

The flow guide mechanism can alternatively also be developed at the inlet port of the bypass flow path or within the bypass flow path as well as be developed as an air damper with a central rotational axis.

The heat exchanger for cooling and/or dehumidifying the inflowing air is preferably implemented as the evaporator of a refrigerant circulation.

The bypass flow path can advantageously be closable and openable continuously between 0% and 100% such that an air mass flow conveyed in the housing can be split in proportions between 0% and 100% into a first air mass subflow through the heat exchanger for cooling and/or dehumidifying the inflowing air or into a second air mass subflow through the bypass flow path.

The heating heat exchanger provided within the first flow path is preferably disposed such that it fills the cross section of the flow path. The contact areas between the heating heat exchanger and the wall of the flow path are advantageously technically closed air-tight such that the air mass flow, conducted through the first flow path, is guided in its entirety across a heat transfer surface of the heating heat exchanger.

The second flow path is preferably developed as a bypass around the heating heat exchanger. The air mass flow conducted through the bypass consequently does not come into contact with the heat transfer surface of the heating heat exchanger.

The flow paths developed within an air distributor of the housing can consequently be operated such that in the first flow path a warm air mass flow, or an air mass flow at higher temperature, and in the second flow path a cold air mass flow, or an air mass flow at low temperature, are conveyed. The air mass flows conducted through the flow paths can be mixed with one another within the mixing chamber.

According to a further advantageous embodiment of the invention, the flow paths with flow guide mechanisms are implemented such that the flow paths are openable and closeable independently of one another, wherein an air mass flow flowing through the air distributor can be split into air mass subflows through the flow paths.

A further advantage of the invention resides therein that the housing, in particular the air distributor, comprises air outlets into the passenger compartment, each of which being implemented such that they open out with an inlet port into the mixing chamber. At least one air outlet is herein provided directed toward the windshield, one air outlet toward the footwell and one air outlet in the dashboard.

The climate control device according to the invention comprises diverse additional advantages:
- selective air routing, in particular through the bypass flow path, results in minimal influence of the bypass flow path on the temperature distribution of the air to be supplied to the passenger compartment or on control curves of the air temperature,
- maximal air quantity conductible through the bypass flow path at given low installation space,
- enhancement of the efficiency of the operation of the climate control system with energy-efficient temperature regulation, also through energy savings due to the lower necessary cooling power,
- humidity control of the air in the passenger compartment by means of outside air conducted through bypass flow path, which allows introducing additional air humidity into the passenger compartment—additional humidity input can at least be utilized within a limited frame to control the air humidity in the passenger compartment thereby that more humid outside air is mixed to the dehumidified air after the evaporator such that the relative air humidity in the passenger compartment can be adjusted to a comfortable level—therewith requirements with respect to temperature distribution and air temperature control, temperature as well as air quantity can be met,
- minimal installation space requirement as well as
- maximal level of comfort for the occupants of the passenger compartment.

Further details, characteristics and advantages of the invention will be evident based on the following description of an embodiment example with reference to the associated drawing. Therein each Figure shows a climate control device of a climate control system of a motor vehicle with a heat exchanger for conditioning the inflowing air for a passenger compartment in cross section.

Figure 1:
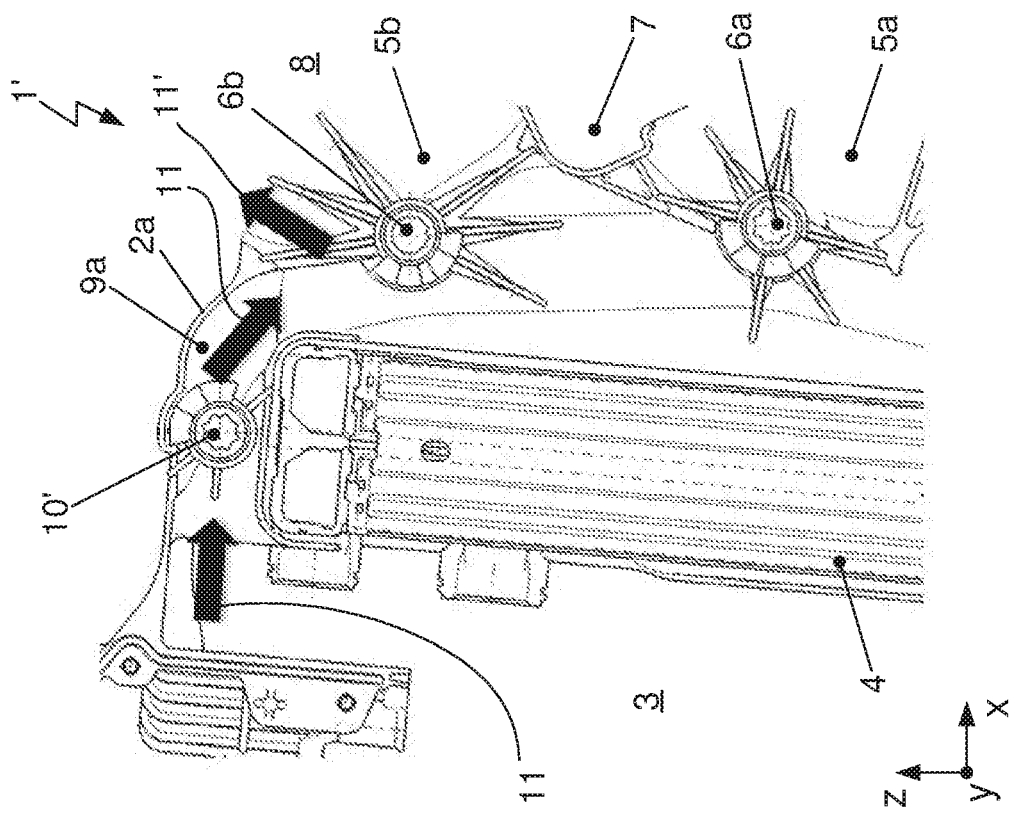
Figure 4:
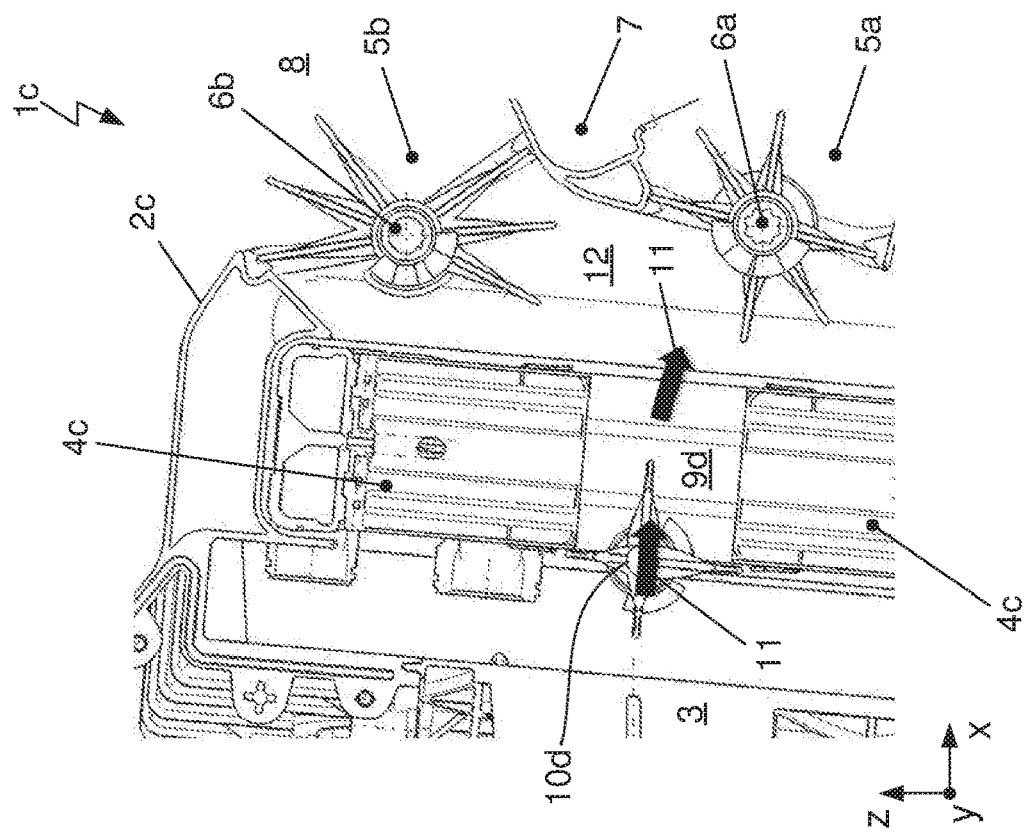
Figure 3A:
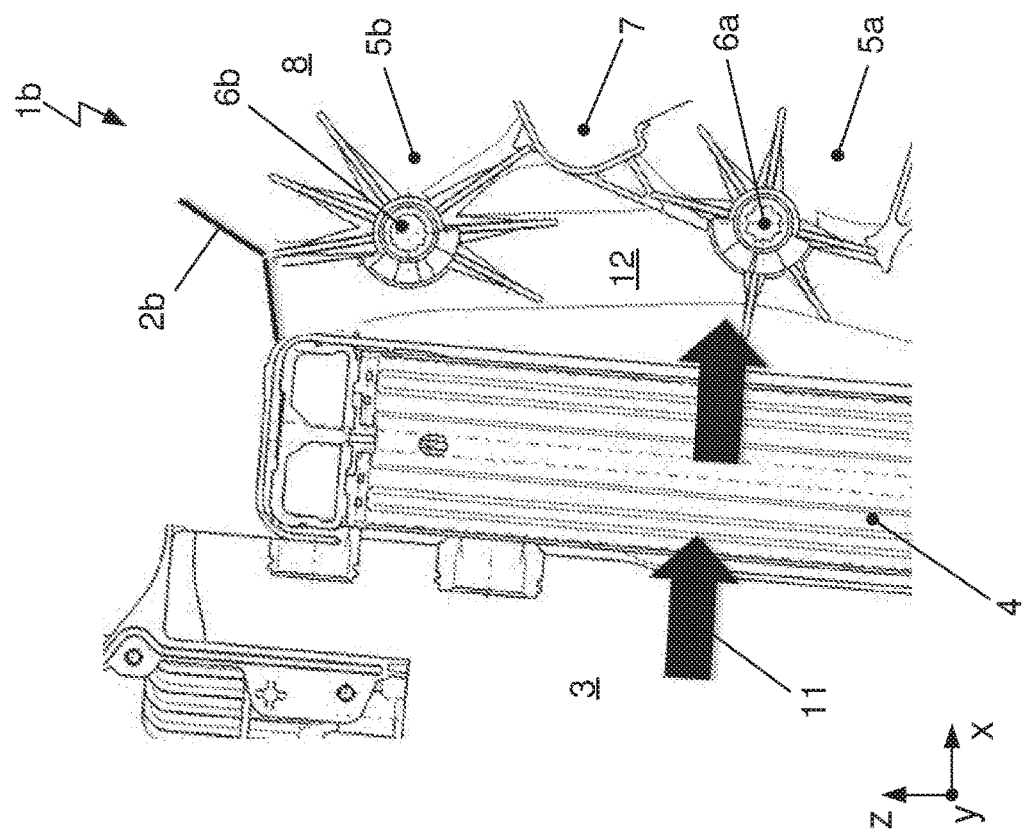

FIG. 1 shows a bypass flow path of prior art disposed in the vertical direction with respect to the heat exchanger and extending in the horizontal direction, FIG. 2 shows a bypass flow path disposed in the vertical direction with respect to the heat exchanger and extending in the horizontal direction as well as with a flow guide mechanism at the outlet port of the bypass flow path, FIG. 3A shows at least one bypass flow path disposed in a horizontal direction with respect to the heat exchanger and extending in a horizontal direction, FIG. 3B shows a split bypass flow path according to FIG. 3A, each path in an opened state, disposed in a horizontal direction with respect to the heat exchanger and extending in a horizontal direction, FIG. 3C shows a split bypass flow path according to FIG. 3A, each in a closed state, disposed in a horizontal direction with respect to the heat exchanger and extending in a horizontal direction, FIG. 3D shows a split bypass flow path according to FIG. 3B with a coupling element for the control of air guide mechanisms of the split bypass flow paths in the opened state, as well as FIG. 3E shows a split bypass flow path according to FIG. 3C with a coupling element for the control of air guide mechanisms of the split bypass flow paths in the closed state, and FIG. 4 shows a split heat exchanger with a bypass flow path extending in the horizontal direction between the elements of the heat exchanger.

DETAILED DESCRIPTION

In FIG. 1 is shown in cross section a climate control device 1' of a climate control system of a motor vehicle, with a housing 2a with a diffuser 3 as well as with a heat exchanger 4 for conditioning the inflowing air for a passenger compartment, in particular an evaporator 4 of a refrigerant circulation of prior art. The climate control device 1' comprises a bypass flow path 9a, developed in the vertical direction z above the heat exchanger 4, which extends in a plane spanned by the horizontal directions x, y. The heat exchanger 4 is substantially disposed in a plane spanned by the horizontal direction y and the vertical direction z. The bypass flow path 9a, is developed at an end side, oriented in the vertical direction z, of the heat exchanger 4.

The climate control device 1' comprises a, not shown, fan for taking in the air through the air inlet as well as for conveying the air through the housing 2a with the diffuser 3. The fan can take in, as needed, fresh air from the surroundings, ambient air from the passenger compartment or a mixture of fresh air and ambient air.

An air mass flow taken in through the air inlet into housing 2a and conducted through the diffuser 3 to an evaporator region can, as needed and according to the operating mode of the climate control system, be split into a first air mass subflow flowing through the heat exchanger 4, operated as evaporator of the refrigerant circulation, and into a second air mass subflow flowing through the bypass flow path 9a. With a flow guide mechanism 10' implemented within the bypass flow path 9a the bypass flow path 9a can be opened and closed continuously between 0% and 100% such that an air mass flow conveyed in housing 2a can be split between 0% and 100% into the first air mass subflow or the second air mass subflow.

The first air mass subflow is conducted across the heat transfer surface of evaporator 4 of the refrigerant circulation. When flowing across the heat transfer surface of the evaporator 4, the air of the first air mass subflow can be cooled and/or dehumidified. The air of the second air mass subflow conducted through the bypass flow path 9a is not conditioned. After it has flowed through the evaporator 4 or the bypass flow path 9a, the air mass subflows are to be mixed with one another again.

The air mass flow, optionally conditioned during its flow through the evaporator region, can subsequently be split into an air mass subflow flowing through a first flow path 5a, in particular a warm air path, and an air mass subflow flowing through a second flow path 5b, in particular a cold air path. The air mass flow can herein be conducted in its entirety into one of the flow paths 5a, 5b or proportionately into both flow paths 5a, 5b.

The air mass flows conducted through the warm air path 5a and the cold air path 5b are controlled with the aid of flow guide mechanisms 6a, 6b opening or closing the flow paths 5a, 5b, wherein the flow guide mechanisms 6a, 6b, developed as temperature dampers, in an end position are each completely closing or opening the warm air path 5a or the cold air path 5b and in intermediate positions clear a portion of the flow cross section of the warm air path 5a and of the cold air path 5b. The flow paths 5a, 5b, opening out into a mixing chamber 8 by means of the flow guide mechanisms 6a, 6b are closable and openable continuously between 0% and 100% such that the air mass flow conveyed in housing 2a can be split between 0% and 100% onto the flow paths in proportions between 0% and 100%.

The flow paths 5a, 5b should be enabled to be supplied with air conditioned in evaporator 4 or with air conducted through the bypass flow path 9a or with an air mass flow of a mixture of the air conditioned in evaporator 4 as well as of the air conducted through the bypass flow path 9a.

In addition, air outlets, not shown, to the windshield, to the footwell and in the dashboard are implemented to open out into the mixing chamber 8.

The air mass flow conducted through the warm air path 5a is heated when flowing across a heat exchanger 7 in particular a heating heat exchanger. The heated air mass flow is subsequently directed into the mixing chamber 8 and can be mixed with the air mass flow of the cold air flowing through the cold air path 5b and also directed into the mixing chamber 8. The second flow path 5b is consequently developed as a bypass to the first flow path 5a. An air mass flow conducted through the second flow path 5b does not experience any change of temperature. An air mass flow conducted through the first flow path 5a is conducted in its entirety across the heat transfer surfaces of the heating heat exchanger 7 and is heated.

The flow guide mechanism 10' for closing and opening the bypass flow path 9a is disposed in the vertical direction z as well as in particular in the horizontal direction x centrally in the flow cross section of the bypass flow path 9a and centered with respect to the evaporator 4. Therefore, the flow guide mechanism 10' as well as its reception in the proximity of the rotational axis is disposed completely within the flow cross section of the bypass flow path 9a, such that the flow cross section of the bypass flow path 9a is at least partially blocked, which increases the flow resistance of the air during its flow through the bypass flow path 9a. The air quantity that can be conducted through the bypass flow path 9a in the direction of flow 11 is thereby strongly affected and reduced.

The air mass flow flowing out of the bypass flow path 9a can, moreover, flow in the direction of flow 11' through the second flow path 5b unhindered and directly into the mixing chamber 8 as well as to the air outlets disposed above the evaporator 4 in the vertical direction z and cannot be guided to the first flow path 5a, which leads to an undesirable effect on the temperature distribution of the air for the passenger compartment. Since in particular the air outlet to the windshield opens out in said region of the mixing chamber 8, the nonconditioned air is directly directed to the windshield which can result in the formation of condensation on the windshield. The first air mass subflow conducted across the heat transfer surface of evaporator 4 of the refrigerant circulation and cooled and/or dehumidified in the process as well as the second air mass subflow conducted through the bypass flow path 9a and nonconditioned, are not sufficiently mixed with one another as would be desired.

In FIG. 2 is shown in cross section a climate control device 1a of a climate control system of a motor vehicle with the housing 2a with the diffuser 3 as well as the heat exchanger 4, in particular the evaporator 4 of the refrigerant circulation, for conditioning the inflowing air for the passenger compartment. The climate control device 1a comprises also the bypass flow path 9a disposed in the vertical direction z above the evaporator 4, which extends in the plane spanned by the horizontal directions x, y.

The essential difference between the climate control device 1a according to FIG. 2 and that of the climate control device 1' of FIG. 1 resides in the implementation and disposition of the flow guide mechanism 10a of the bypass flow path 9a which is shown in two end positions. In a first end position the flow guide mechanism 10a completely closes the bypass flow path 9a, while the flow guide mechanism 10a in a second end position completely opens the opening the bypass flow path 9a.

Identical features of climate control devices 1a, 1' are identified by identical reference numbers. For the implementation of identical features, reference is made to the explanations of FIG. 1.

In the climate control device 1a according to FIG. 2 the flow guide mechanism 10a for opening and closing the bypass flow path 9a is disposed, for one, at the outlet port of the bypass flow path 9a and, for another, in the proximity of the wall of the bypass flow path 9a such that the flow cross section of the opened bypass flow path 9a is not decreased by the flow guide mechanism 10a.

The flow guide mechanism 10a implemented as an end-supported air damper, that is with a rotational axis disposed on a first end of the air damper, as well as its reception is disposed in the proximity of the rotational axis outside of the flow cross section of the bypass flow path 9a such that the flow resistance of the air during its flow through the bypass flow path 9a as well as also the air quantity that can be conducted through the bypass flow path 9a are not affected. Compared to climate control device 1' of prior art according to FIG. 1, the flow cross section of the opened bypass flow path 9a and the air quantity that can be conducted through the bypass flow path 9a are increased and the flow resistance of air during its flow through the bypass flow path 9a in the direction of flow 11 is as well decreased.

With the disposition of the flow guide mechanism 10a in the second end position, and therewith with the bypass flow path 9a completely opened, the bypass flow path 9a is moreover expanded up into a mixing zone 12 such that the air mass flow flowing out of the bypass flow path 9a in the direction of flow 11 is directed in the vertical direction z downwardly into the mixing zone 12 such that, on the one hand, an unhindered and direct introduction of the air mass flow, conducted and nonconditioned through bypass flow path 9a, into the mixing chamber 8 as well as a flow to the air outlets, disposed in the vertical direction z above the evaporator 4, is prevented. A second end, developed distally to the first end, of the air damper 10a projects into the mixing zone 12. The second air mass subflow conducted through the bypass flow path 9a can be conducted more directly than is the case in the prior art climate control device 1' according to FIG. 1 to the first flow path 5a with the heating heat exchanger 7 disposed therein.

The first air mass subflow, conducted and cooled and/or dehumidified across the heat transfer surface of evaporator 4, as well as the second air mass subflow, conducted and non-conditioned through the bypass flow path 9a, are sufficiently mixed with one another to ensure the desired temperature distribution at the air outlets into the passenger compartment.

To decrease further the effect of the air mass flow, conducted through the bypass flow path 9a, on the temperature distribution of the inflowing air directed into the passenger compartment through the air outlets, the air mass flow conducted through the bypass flow path 9a is to be guided directly up to the warm air path 5a, in particular to the temperature damper 6a, and through the warm air path 5a with the heating heat exchanger 7 specifically into the mixing chamber 8.

In FIG. 3A a climate control device 1b of a climate control system of a motor vehicle is shown in cross section with a housing 2b with diffuser 3 as well as with the heat exchanger 4 for conditioning the inflowing air for the passenger compartment, in particular the evaporator 4 of the refrigerant circulation. The climate control device 1b comprises at least one bypass flow path, developed next to the heat exchanger 4 in the horizontal direction y, which extends in a plane spanned by the horizontal direction x and the vertical direction z.

The essential difference between the climate control device 1b according to FIG. 3A and the climate control device 1a of FIG. 2 resides in the implementation and disposition of the bypass flow path. The heat exchanger 4 is in contact with the end sides directed in the vertical direction z on the wall of housing 2b, wherein between these end sides and the wall no bypass flow path is developed.

Identical features of the climate control devices 1b, 1a are identified by identical reference numbers. In regard to the implementation of identical features, reference is made to the explanations of FIGS. 1 and 2.

FIG. 3B to 3E show each the climate control device 1b with the housing 2b with the diffuser 3 as well as with the heat exchanger 4, in particular the evaporator 4, of FIG. 3A in cross section. The climate control device 1b comprises a split bypass flow path 9b, 9c extending in a plane developed in the horizontal direction y next to the heat exchanger 4 spanned by the horizontal direction x and the vertical direction z. According to FIG. 3B and FIG. 3D the bypass flow paths 9b, 9c are each shown in an opened state and according to FIG. 3C as well as FIG. 3E in a closed state.

The bypass flow paths 9b, 9c are each disposed in the horizontal direction y laterally to the evaporator 4, in particular on end sides oriented in the horizontal direction y, such that with the bypass flow paths 9b, 9c opened, the second air mass subflow conducted through the bypass flow paths 9b, 9c is, again split into air mass subflows, conducted through a first bypass flow path 9b and a second bypass flow path 9c. The bypass flow paths 9b, 9c open out into a mixing zone 12 developed, in the direction of flow 11 of the air, after the evaporator 4. The second air mass subflow conducted through the bypass flow paths 9b, 9c, can be conducted on a direct path to the warm air path.

The air mass subflows, substantially conducted in the horizontal direction x through the bypass flow paths 9b, 9c and consequently laterally past the evaporator 4, can, depending on the operating mode, be mixed with the air mass subflow flowing through evaporator 4 in the direction of flow 11 before the, not shown, temperature dampers of the warm air path with the heating heat exchanger and of the cold air path. The air is subsequently supplied to the warm air path and/or the cold air path.

The bypass flow paths 9b, 9c are each openable and closable continuously between 0% and 100% with a flow guide mechanism 10b, 10c. Each flow guide mechanism 10b, 10c is disposed at the inlet port of the bypass flow paths 9b, 9c as well as in the proximity of the wall of housing 2b, in particular of the bypass flow paths 9b, 9c, such that the flow cross sections of the opened bypass flow paths 9b, 9c are not affected.

The flow guide mechanisms 10b, 10c implemented as end-supported air dampers, in particular each with a rotational axis on a first end of the air damper, as well as their reception in the proximity of the rotational axis, are disposed outside of the flow cross sections of the bypass flow paths 9b, 9c such that the flow resistance of the air when flowing through the bypass flow paths 9b, 9c as well as also the air quantities, that can be conducted in the direction of flow 11 through the bypass flow paths 9b, 9c, remain free of any influence by the flow guide mechanisms 10b, 10c.

The air dampers 10b of the first bypass flow path 9b and of the second bypass flow path 9c are each implemented and disposed such that they, in a first end position in the closed state of the bypass flow paths 9b, 9c, according to FIG. 3C, guide the air mass flow conveyed into the housing 2b as a portion of the wall along the wall of housing 2b in the direction of the heat exchanger 4. The second end, developed distally to the first end, of the air damper 10b of the first bypass, flow path 9b is in contact on a margin region of the heat exchanger 4. The second end of air damper 10c of the second bypass flow path 9c, developed distally to the first end, is in contact on the wall of housing 2b such that it extends the wall in the direction of heat exchanger 4.

In a second end position of air dampers 10b, 10c according to FIG. 3B, and thus in the opened state of the first bypass flow path 9b, the air damper 10b is disposed in contact on the wall of housing 2b or integrated within the wall of housing 2b. In a second end position, in the opened state of the second bypass flow path 9c, the air damper 10c is disposed such that it projects with the second, free end in particular into the diffuser 3, disposed in the direction of flow 11 of the air after the air inlet, such that a first air mass subflow is guided into the second bypass flow path 9c and a second air mass subflow to the heat exchanger 4 as well as to the first bypass flow path 9b. With the air damper 10c in the open position, consequently an air mass subflow of the air mass flow conducted through the diffuser 3 is branched off and conducted into the bypass flow path 9c. The separation of the second air mass subflow through the heat exchanger 4 and the first bypass flow path 9b occurs via the flow resistances of the air when flowing through the heat exchanger 4 and of the first bypass flow path 9b. In particular the bypass flow path 9b is developed such that the proportions of the air mass flows conducted through the bypass flow paths 9b, 9c are as much as possible equal.

The flow guide mechanisms 10b, 10c disposed in the horizontal direction y laterally to the evaporator 4, are disposed according to FIG. 3D such that they can be swiveled in opposite directions about a rotational axis in a direction of rotation 13b, 13c. To ensure the simultaneous and smooth movement of the flow guide mechanisms 10b, 10c, the flow guide mechanisms 10b, 10c are mechanically connected with one another by means of a coupling element 14 for the control of the opening and closing processes of the bypass flow paths 9b, 9c.

The coupling element 14, for example of rodding, is connected with the flow guide mechanisms 10b, 10c such that a motion of the coupling elements 14 executed substantially in the horizontal direction y, results in the rotation in particular continuously of the flow guide mechanisms 10b, 10c in the oppositely directed directions of rotation 13b, 13C between the end positions.

In FIG. 4 is depicted in cross section a climate control device 1c of a climate control system of a motor vehicle with a housing 2c with the diffuser 3 as well as with a heat exchanger 4c in particular with an evaporator 4c of the refrigerant circulation for conditioning the inflowing air for a passenger compartment. The climate control device 1c comprises a split heat exchanger 4c with a bypass flow path 9d extending in a plane spanned by the horizontal directions x, y between the elements of the heat exchanger 4c.

The essential difference between the climate control device 1c according to FIG. 4 and the climate control device 1a of FIG. 2 and the climate control device 1b of FIG. 3A is evident in the implementation and the disposition of flow path 9d. The heat exchanger 4c is in contact with the end sides oriented in the vertical direction z on the wall of housing 2c, wherein between the end sides and the wall no bypass flow path is developed.

Identical features of the climate control devices 1a, 1b, 1c are again identified by identical reference numbers. Regarding the implementation of identical features, reference is made to the explanations in connection with FIGS. 1 and 2.

The heat exchanger 4c is implemented of at least one first element, in the vertical direction y the upper element, as well as of a second, in the vertical direction y, the lower element. The elements of the heat exchange 4c are spaced apart in the vertical direction y such that between the elements a throughflow, in particular the bypass flow path 9d, remains for the air taken into the housing 2c. The elements of the heat exchanger 4c can have the same dimensions or be dimensioned differently.

The air mass subflows, conducted in the direction of flow 11 and thus substantially in the horizontal direction x, through the elements of evaporator 4c as well as through the bypass flow path 9d, are, depending on the operating mode, mixed in the mixing zone 12 developed before the temperature damper 6a of the warm air path 5a with the heating heat exchanger and the temperature damper 6b of the cold air path 5b. The mixed air is subsequently supplied to the warm air path 5a and/or to the cold air path 5b. The second air mass subflow conducted through the bypass flow path 9d can also be guided directly to the warm air path 5a with the heating heat exchanger 7 disposed therein.

The first air mass subflow, conducted across the heat transfer surfaces of evaporator 4c of the refrigerant circulation and cooled and/or dehumidified, as well as the second air mass subflow, conducted through the bypass flow path 9d and not conditioned, are sufficiently mixed with one another to ensure a desired temperature distribution at the air outlets into the passenger compartment.

The flow path 9d, implemented to open out into the mixing zone 12 such that the air mass flow guided through the flow path 9d and past the evaporator 4c can also be guided directly to the temperature damper 6a of the warm air path 5a in order to decrease further the effect of the air mass flow, conducted through the bypass flow path 9d, on the temperature distribution of the inflowing air to be introduced through the air outlets into the passenger compartment.

The bypass flow path 9d is openable and closable continuously between 0% and 100% with a flow guide mechanism 10d. The flow guide mechanism 10d, developed as air damper with a central rotational axis, is herein disposed at the inlet port of the bypass flow path 9d within the open flow cross section. According to alternative, not shown, embodiments, the flow guide mechanism is disposed at the outlet port of the bypass flow path 9d into the mixing zone 12 or in the horizontal direction x centered with respect to evaporator 4c. The flow guide mechanism can, furthermore, also be developed as an end-supported air damper, which means with a rotational axis disposed on a first end of the air damper, in order to be disposed in the opened state outside of the flow cross section of the bypass flow path 9d.

With the implementations of the climate control device 1b, 1c, in particular with the first bypass flow path 9b and the second bypass flow path 9c, and thus with a split bypass flow path around the evaporator 4, as well as with the bypass flow path 9d, developed between elements of the divided evaporator 4c, a maximal air quantity can be guided around the evaporator 4, 4c, whereby the air quantity depends on the available cross-sectional space, which means on the width and height of the flow cross sections of the bypass flow paths 9d, 9c as well as on the flow cross section of the flow path 9d. The pressure loss of the bypass flow path is in each case minimal.

The second air mass subflow conducted through the bypass flow paths 9b, 9c, 9d and the first air mass subflow conducted through evaporator 4, 4c, are again mixed with one another such that the characteristic of the temperature distribution at the air outlets of the climate control device 1b, 1c is positively affected or not affected at all, such that a desired temperature distribution is achieved.

LIST OF REFERENCE SYMBOLS 1a, 1b, 1c, 1' Climate control device
2a, 2b, 2c Housing
3 Diffuser
4, 4c Heat exchanger, evaporator refrigerant circulation
5a First flow path, warm air path
5b Second flow path, cold air path
6a First flow guide mechanism, temperature damper warm air path 5a
6b Second flow guide mechanism, temperature damper cold air path 5b
7 Heat exchanger, heating heat exchanger
8 Mixing chamber
9a, 9d Bypass flow path evaporator 4
9b First bypass flow path evaporator 4
9c Second bypass flow path evaporator 4
10a, 10d, 10' Flow guide mechanism, air damper bypass flow path
10b Flow guide mechanism, air damper bypass flow path
10c Flow guide mechanism, air damper bypass flow path
11, 11' Direction of flow of air
12 Mixing zone 13b Direction of rotation third flow guide mechanism 10b
13c Direction of rotation fourth flow guide mechanism 10c
14 Coupling element flow guide mechanisms 10b, 10c
x, y Horizontal direction
z Vertical direction

The invention claimed is:

1. A climate control device for a motor vehicle with means for conveying and conditioning inflowing air for a passenger compartment, comprising:
   a housing with, in the direction of flow of the air, a diffuser, a mixing zone and at least two flow paths disposed such that through them flow can be conducted in parallel, which paths extend from the mixing zone to a mixing chamber, wherein within a first flow path of the at least two flow paths a heating heat exchanger is disposed for heating at least one air mass subflow,
   a heat exchanger for cooling and/or dehumidifying the inflowing air, which is disposed within a flow channel filling the cross section of the flow channel,
   at least one bypass flow path, through which air can flow in parallel to the flow channel with the cooling heat exchanger, with at least one flow guide mechanism for opening and closing a flow cross section of the at least one bypass flow path, wherein the flow channel and the at least one bypass flow path open out with outlet ports into the mixing zone,
   wherein the outlet port of the at least one bypass flow path for the specific discharging of an air mass subflow, conveyed through the at least one bypass flow path, into the first flow path is developed in the proximity of an opening site of another flow path leading into the mixing zone, and
   wherein the at least one bypass flow path comprises a first bypass flow path and a second bypass flow path, which comprise the at least one flow guide mechanism as a first flow guide mechanism and a second flow guide mechanism, respectively, all of which are disposed at opposite end faces, developed oppositely to one another, of the cooling heat exchanger.

2. A climate control device as in claim 1, wherein the first bypass flow path and the second bypass flow path are developed such that they open out at opposite sides into the mixing zone.

3. A climate control device as in claim 1, wherein the flow guide mechanisms are each developed as an end-supported air damper with a rotational axis on a first end of the air damper, which is disposed outside of a flow cross section of the bypass flow path.

4. A climate control device as in claim 1, comprising
   wherein the first flow guide mechanism is disposed at an inlet port of the first bypass flow path and in the proximity of a wall of the housing, wherein the first flow guide mechanism, in an end position in which the first bypass flow path is completely opened, is in contact on the wall of the housing.

5. A climate control device as in claim 1, wherein the second flow guide mechanism comprises a first end and a second end and is disposed at an inlet port of the second bypass flow path, wherein the second flow guide mechanism in a first position, in which the second bypass flow path is completely opened, with the second end, developed distally to the first end, projects into another flow channel extending from an air inlet, in particular the diffuser, to the cooling heat exchanger splitting a flow cross section of the another flow channel, as well as in a second position, in which the second bypass flow path is completely closed, the second end is in contact with a wall of the another flow channel and thus extends the wall.

6. A climate control device as in claim 3, wherein the flow guide mechanisms are each developed such that they can be swivelled about a rotational axis in a direction of rotation opposite to one another.

7. A climate control device as in claim 3, wherein the flow guide mechanisms are mechanically coupled with one another by a coupling element for the simultaneous control of the opening and closing of the bypass flow paths.

8. A climate control device as in claim 1, wherein the heat exchanger is developed as an evaporator of a refrigerant circulation for cooling and/or dehumidifying the inflowing air.

9. A climate control device as in claim 1, wherein the first or the second bypass flow path is developed such that with the at least one flow guide mechanism it is continuously openable and closable between 0% and 100%.

10. A climate control device as in claim 1, wherein the heating heat exchanger is disposed such that it fills the cross section of the first flow path such that an air mass flow, conducted through the first flow path, is guided in its entirety across a heat transfer surface of the heating heat exchanger and a second flow path of the at least two flow paths is developed as a bypass around the heating heat exchanger.

11. A climate control device as in claim 1, wherein the housing comprises air outlets into the passenger compartment which are each developed such that they open out with an inlet port into the mixing chamber.

12. A climate control device for a motor vehicle with means for conveying and conditioning inflowing air for a passenger compartment, comprising
   a housing with a, in the direction of flow of the air, a diffuser, a mixing zone and at least two flow paths disposed such that through them flow can be conducted in parallel, which paths extend from the mixing zone to a mixing chamber, wherein within a first flow path of the at least two flow paths a heating heat exchanger is disposed for heating at least one air mass subflow,
   a heat exchanger for cooling and/or dehumidifying the inflowing air, which is disposed within a flow channel filling the cross section of the flow channel,
   at least one bypass flow path, through which air can flow in parallel to the flow channel with the cooling heat exchanger, with at least one flow guide mechanism for opening and closing a flow cross section of the bypass flow path, wherein the flow channel and the bypass flow path open out with outlet ports into the mixing zone,
   wherein the outlet port of the at least one bypass flow path for the specific discharging of an air mass subflow, conveyed through the at least one bypass flow path, into the first flow path is developed in the proximity of an opening site of another flow path into leading the mixing zone, and
   wherein the heat exchanger is divided into at least two elements, wherein the elements are spaced apart from one another such that an interspace is formed and the at least one bypass flow path is disposed between the elements.

13. A climate control device as in claim 12, wherein the at least one flow guide mechanism is developed as an end-supported air damper with a rotational axis disposed on a first end of the air damper, as well as being disposed at an outlet port of the bypass flow path into the mixing zone such that in an end position of the at least one flow guide mechanism the at least one bypass flow path is completely opened and a second end, developed distally to the first end, is disposed such that it projects into the mixing zone.

14. A climate control device as in claim 12, wherein the heat exchanger is developed as an evaporator of a refrigerant circulation for cooling and/or dehumidifying the inflowing air.

15. A climate control device as in claim 12, wherein the at least one bypass flow path is developed such that with the at least one flow guide mechanism it is continuously openable and closable between 0% and 100%.

16. A climate control device as in claim 12, wherein the heating heat exchanger is disposed such that it fills the cross section of the first flow path such that an air mass flow, conducted through the first flow path, is guided in its entirety across a heat transfer surface of the heating heat exchanger and a second flow path of the at least two flow paths is developed as a bypass around the heating heat exchanger.

17. A climate control device as in claim 12, wherein the housing comprises air outlets into the passenger compartment which are each developed such that they open out with an inlet port into the mixing chamber.

\* \* \* \* \*